United States Patent
Woelfel et al.

(10) Patent No.: US 7,097,730 B2
(45) Date of Patent: Aug. 29, 2006

(54) METHOD AND APPARATUS FOR ASSEMBLING A VEHICLE WHEEL

(75) Inventors: James A. Woelfel, Holt, MI (US); Brian C. Wrase, Grand Rapids, MI (US)

(73) Assignee: Lacks Industries, Inc., Grand Rapids, MI (US)

( * ) Notice: Subject to any disclaimer, the term of this patent is extended or adjusted under 35 U.S.C. 154(b) by 266 days.

(21) Appl. No.: 10/352,311

(22) Filed: Jan. 27, 2003

(65) Prior Publication Data

US 2004/0144475 A1    Jul. 29, 2004

(51) Int. Cl.
- *B29C 65/00*    (2006.01)
- *B60B 7/00*    (2006.01)
- *B60B 7/06*    (2006.01)
- *B32B 5/18*    (2006.01)

(52) U.S. Cl. .................. 156/290; 156/77; 156/76; 264/41; 264/46.4; 264/46.5; 301/37.101; 301/37.102; 301/37.11

(58) Field of Classification Search ............. 156/290; 301/37.101, 37.102, 37.31, 37.34, 37.11, 301/37.12; 264/41, 46.4, 46.5
See application file for complete search history.

(56) References Cited

U.S. PATENT DOCUMENTS

| 4,251,476 A | 2/1981 | Smith |
| 4,398,770 A | 8/1983 | Smith |
| 4,786,027 A | 11/1988 | Stalter, Sr. |
| 4,927,347 A | 5/1990 | Golata et al. |
| 4,935,085 A | 6/1990 | Maruyama et al. |
| 4,963,083 A | 10/1990 | Stalter, Sr. et al. |
| 4,976,497 A | 12/1990 | Post et al. |
| 5,098,272 A | 3/1992 | Joseph et al. |
| 5,401,079 A | 3/1995 | Rooney |
| 5,820,225 A * | 10/1998 | Ferriss et al. .......... 301/37.371 |
| 5,874,037 A | 2/1999 | Saia et al. |
| 6,460,938 B1 | 10/2002 | Baumgarten |

\* cited by examiner

*Primary Examiner*—Justin Fischer
(74) *Attorney, Agent, or Firm*—VanOphem & VanOphem, P.C.

(57) ABSTRACT

A method and apparatus for attaching an ornamental overlay to a vehicle wheel by injecting adhesive foam through an aperture of the wheel and into a cavity formed between the wheel and the overlay. A first nest engages the outboard side of the wheel/overlay assembly to seal the inner periphery of the overlay, the valve stem opening of the overlay, the lug bolt receiving holes of the wheel, the pilot aperture of the wheel, and/or the valve stem opening of the wheel. A secondary nest engages the inboard side of the wheel/overlay assembly to seal the wheel apertures and a plurality of turbine openings in the overlay. A nozzle disposed within the secondary nest is adapted to inject the adhesive foam into the cavity through either a gap between the periphery of a wheel aperture and the periphery of a corresponding turbine opening in the overlay, through a straight or angled hole within a spoke, or through a groove within a spoke.

26 Claims, 10 Drawing Sheets

METHOD AND APPARATUS FOR ASSEMBLING A VEHICLE WHEEL

CROSS-REFERENCES TO RELATED APPLICATIONS

Not applicable.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates to composite wheel assemblies for vehicles having an overlay permanently attached to a wheel, and particularly to an improved method and apparatus for permanently attaching an ornamental overlay to the wheel by injecting foam through a nest such that a separate pour opening in the wheel is not required.

2. Description of the Related Art

Decorative overlays are widely used to enhance the aesthetic appearance of automotive wheels. Numerous structural combinations of overlays with chrome-plated outboard surfaces have attracted great interest from vehicle manufacturers, because they are lightweight, aesthetically pleasing and offer designers complete flexibility with regard to the aesthetic effect that can be created for a specific vehicle regardless of whether these vehicles use steel or aluminum wheels.

There are several known methods of adhering a wheel cover to a wheel as will be discussed hereinafter. U.S. Pat. No. 3,915,502 to Connell teaches an annular-shaped wheel cover that is permanently attached to the wheel with double-sided adhesive tape. The adhesive tape is positioned midway between the rim and the center hub area of the wheel, while the remainder of the wheel cover is spaced apart from the outboard surface of the wheel. Connell positions the adhesive tape at radially outward portions of the wheel in order to avoid the deleterious effects of heat generated by the tire, wheel and brake. While some pressure-sensitive adhesive tapes can be effectively used in temperatures up to 500° Fahrenheit (260° C.), the cost of such adhesive tapes is generally prohibitive for use in mass production applications such as securing an overlay to a wheel. Consequently, such applications are generally limited to the use of less expensive adhesive tapes that have relatively low maximum operating temperatures, necessitating that their placement be restricted to the radially outward surfaces of the wheel. Unfortunately, doing so severely limits the adhesive tape's ability to reliably adhere the overlay to the wheel. Further, the adhesive tape's thickness creates a void between the overlay and the wheel that can collect dirt and debris that may affect the balance of the wheel.

To avoid such problems, the prior art proposes the use of a urethane foam adhesive which effectively holds the wheel cover in place, closes the void between the overlay and the wheel, reduces noise, and provides theft deterrence. This method is best described in U.S. Pat. No. 3,669,501 to Derleth that discloses an annular-shaped overlay composed of a thin plastic cover formed from acrylonitrile-butadiene-styrene (ABS) mounted to a wheel spider. The overlay is configured to have variations in contours in a direction transverse to the axis of the wheel that exceed the variations in the rim and/or disc contour of the wheel, which variations would be extremely difficult and expensive, if not impossible, to stamp or draw in the disc of the wheel. During assembly, a foamable polyurethane adhesive is coated on the wheel, and the cover is then quickly clamped to the wheel before the polyurethane begins to foam. As such, the void between the wheel and cover is filled with the polyurethane foam. However, any excess polyurethane foam around the bolt holes or at the periphery of the assembly surrounding the axle hub will squeeze out if appropriate sealing provisions are not made.

One obvious shortcoming of the process disclosed by Derleth is that the composite wheel must be imperforate, except for the small bolt openings necessary for attaching the wheel to a vehicle. It is understood by those skilled in the art that it is necessary to avoid the deleterious effects of heat generated by the wheel and brake, that cause the ABS plastic overlay to distort, cause delamination of any surface treatment, i.e. paint, plating, etc., and further cause the foam adhesive to degrade, distort and eventually melt. Furthermore, wheels assembled according to the Derleth disclosure were very heavy due to the high density of the foam, and variation in localized foam density resulted in severe wheel imbalances.

Turbine openings dissipate heat generated by the brake system and may be configured to provide a variety of distinct aesthetic impressions that add individuality and style to a vehicle. Any opening in the wheel or overlay using the process disclosed in Derleth is a pathway for the foam mixture to escape when it begins to foam and/or cure. Larger openings, such as turbine openings, would not be possible using the Derleth process without additional structure to seal the openings and prevent the foam material from escaping.

It is appreciated by those skilled in the art that it is advantageous to completely fill the cavity with foam adhesive to acoustically dampen any sound produced when the overlay is struck. A drawback of the process according to Derleth is that excess foam mixture is required to ensure that the cavity between the cover and the wheel is completely filled, and subsequently any excess foam must be manually removed, which adds significant cost to the process.

An improved apparatus for attaching a wheel cover to a wheel is taught by U.S. Pat. No. 6,346,159 to Chase, assigned to the assignee hereof. Chase discloses an overlay aligned with, located, and clamped to the wheel with the exception of predetermined sealed areas. The outboard surfaces of the overlay and wheel are spaced apart, leaving a cavity therebetween. Localized nests at strategically placed locations act on the wheel and overlay assembly to seal the assembly on the wheel and thereby create a mold cavity. Net standoffs may be used to assist locating the cover with respect to the wheel and the localized nests interact with the overlay and wheel assembly to create a mold cavity between the overlay and the wheel into which the liquid foam is injected and allowed to react to fill the cavity. A metering unit is used to accurately mix and dispense the two component urethane foam. A nozzle engages a fill port machined into the wheel spider in the back side of the wheel to inject the foamable material in the cladding/wheel assembly cavity.

A disadvantage with the Chase invention is that the wheel must be provided with a fill port through which the urethane foam is injected. Accordingly, the Chase invention requires an additional process of machining the fill port in the wheel spider such that the overall process is more expensive. Furthermore, the additional process for machining the fill port degrades the structural integrity of the wheel by removing material therefrom.

U.S. Pat. No. 5,098,272 to Joseph et al. specifically addresses the aforementioned problem identified with respect to Chase by providing an apparatus for injecting adhesive into the mold through a pre-existing bolt hole in the wheel. Unfortunately, the Joseph et al. invention is limited to applications wherein the wheel cover extends radially beyond the bolt hole circle in the wheel such that adhesive injected into the bolt hole of the wheel is introduced within the mold formed in part by the wheel and the wheel cover. Furthermore, it would be desirable to have the flexibility of injecting the adhesive through locations other than the bolt holes for a variety of reasons including but not limited to the following. First, depending upon the configuration of the mold and the flow characteristics of the particular adhesive, it is often preferable to inject the adhesive into specific regions of the mold to ensure it is completely and uniformly filled, whereby the flexibility of selecting the injection location allows optimization of the injection process for the specific application. Additionally, in some applications the fixturing devices, locating devices, clamping systems, nesting systems and/or injection apparatus may limit accessibility to certain regions of the mold such that it would be desirable to have a variety of potential injection locations from which to choose.

From the above, it can be appreciated that the method and apparatus for attaching a wheel cover to a wheel are not fully optimized. Therefore, what is needed is an economical method and apparatus for assembling an overlay to a wheel by injecting adhesive into a mold through an existing wheel aperture.

BRIEF SUMMARY OF THE INVENTION

According to the preferred embodiment of the present invention, there is provided a method and apparatus for permanently attaching a wheel cover or overlay to a wheel by injecting adhesive foam into a cavity formed between the outboard surface of the wheel and the wheel cover. For purposes of clarity, the present invention is disclosed as producing a wheel cover with a plurality of turbine openings that is permanently mounted to a wheel having a plurality of spokes with apertures therebetween, whereby the turbine openings in the wheel cover are radially aligned with and correspond in number to the apertures in the wheel. It should, however, be appreciated by one of ordinary skill in the art that the present invention is adapted to accommodate a variety of different wheel assembly configurations for different wheel applications. Furthermore, according to the preferred embodiment an adhesive sealant is applied to selective portions of the wheel cover and/or the wheel before the parts are assembled, however it should also be appreciated that this step may not be necessary in some applications. Finally, the adhesive sealant of the preferred embodiment may alternatively be replaced with an element adapted exclusively for adhesion or exclusively for sealing, as required for a particular application.

The wheel cover is located and oriented with the outboard surface face down in a fixture adapted to accommodate both the wheel and the wheel cover. A vacuum may be applied to the wheel cover to remove any warpage and provide a truer inboard surface. A robotic applicator system preferably applies the adhesive sealant to the wheel cover at preselected locations typically including the outer periphery, the inner periphery, and/or around each turbine opening. The adhesive sealant or an adhesion promotor can also be applied to other areas for additional adhesion, additional sealing, or to direct the foam flow pattern.

The wheel is loaded into the fixture with its outboard surface facing the inboard surface of the wheel cover. The wheel is located and aligned in the fixture and engaged with the wheel cover such that the wheel and the wheel cover form a cavity therebetween. Intermediate attachment and location features such as a secondary clamping system are preferably used to maintain engagement between the wheel and the wheel cover while the adhesive sealant sets or cures. Thereafter the wheel and overlay are preheated to a defined temperature that enhances foam initiation time, adhesion, gel, cohesion, filling, and resultant mechanical properties of the foam adhesive. The step of preheating the wheel and overlay also serves to cure the adhesive sealant in the preferred embodiment wherein dual component adhesive sealant is implemented.

The preheated wheel and overlay are then placed in a filling station that includes a primary clamping system, a first set of nests, a secondary nest and a foam metering unit. The primary clamping system is adapted to prevent separation of the wheel cover from the wheel during the injection and subsequent expansion of the foam adhesive. The first set of nests includes a center bottom nest adapted to engage the outboard surface of the wheel/overlay assembly and seal one or more of the following: the inner periphery of the wheel cover; the valve stem opening of the wheel cover; the lug bolt receiving holes of the wheel; the pilot aperture of the wheel; and/or the valve stem opening of the wheel. Alternatively, the first set of nests may include a separate valve stem opening nest adapted to independently seal the valve stem opening in the wheel and the wheel cover. The secondary nest engages the inboard surface of the wheel/ overlay assembly to seal the wheel apertures and the turbine openings of the wheel cover. The secondary nest is preferably vented so that any air trapped within the cavity can be released through the vents thereby allowing the foam adhesive to completely fill the cavity, optionally one or more vents can be connected to a controlled vacuum device to further aid evacuation of the air from the cavity.

The foam metering unit is used to accurately mix and dispense the foam adhesive, which in one example is composed of dual component urethane foam. The foam metering unit includes an injector nozzle disposed complimentary with the secondary nest that is preferably configured to inject the adhesive foam through a gap formed between the periphery of each wheel aperture and the periphery of a complementary turbine opening, and into the cavity formed between the wheel and the wheel cover. The present invention should not, however, be limited to the specific injection location of the preferred embodiment as it is envisioned that the injection may take place in a variety of locations. As it is not necessary to provide a separate pour opening used solely to inject the foam, the wheel is less expensive in that the operation providing the pour opening is not required, and the structural integrity of the wheel is not diminished by removing material to form the pour opening. The primary clamping system remains engaged for a predetermined time to allow the adhesive foam to finish expanding and is thereafter released providing a wheel with a wheel cover permanently attached thereto.

It is an object of the present invention to provide a method and apparatus for permanently attaching a wheel cover to a wheel by injecting adhesive foam into a cavity formed therebetween.

It is another object that such a method and apparatus is economical and reliable.

It is yet another object that such a method and apparatus provide a wheel cover permanently attached to a wheel without degrading the structural integrity of either component.

It is still another object that such a method and apparatus is configured to enable assembly of applications in which the wheel cover does not radially extend beyond the bolt hole circle of the wheel.

It is a further object that such a method and apparatus is configured to enable assembly of applications in which the wheel cover does radially extend beyond the bolt hole circle of the wheel except for the bolt holes and pilot hole.

It is yet a further object that such a method and apparatus provide a plurality of locations at which the adhesive may be injected into the cavity such that the injection process may be optimized for each specific application.

It is still a further object that such a method and apparatus implement an adhesive and/or sealant adapted to retain the adhesive foam whereby an expensive foam trimming operation is not required.

It is another object that such a method and apparatus incorporate a hole located within one or more of the wheel spokes, whereby the hole is adapted to introduce adhesive foam directly into a flow channel to ensure the cavity is uniformly filled.

It is another object that such a method and apparatus incorporate a concave groove located within one or more of the wheel spokes, whereby the groove is adapted to provide clearance for introducing adhesive foam directly into the flow channel.

These objects and other features, aspects, and advantages of this invention will be more apparent after a reading of the following detailed description, appended claims, and accompanying drawings.

DETAILED DESCRIPTION OF THE PREFERRED EMBODIMENT

Figure 1:
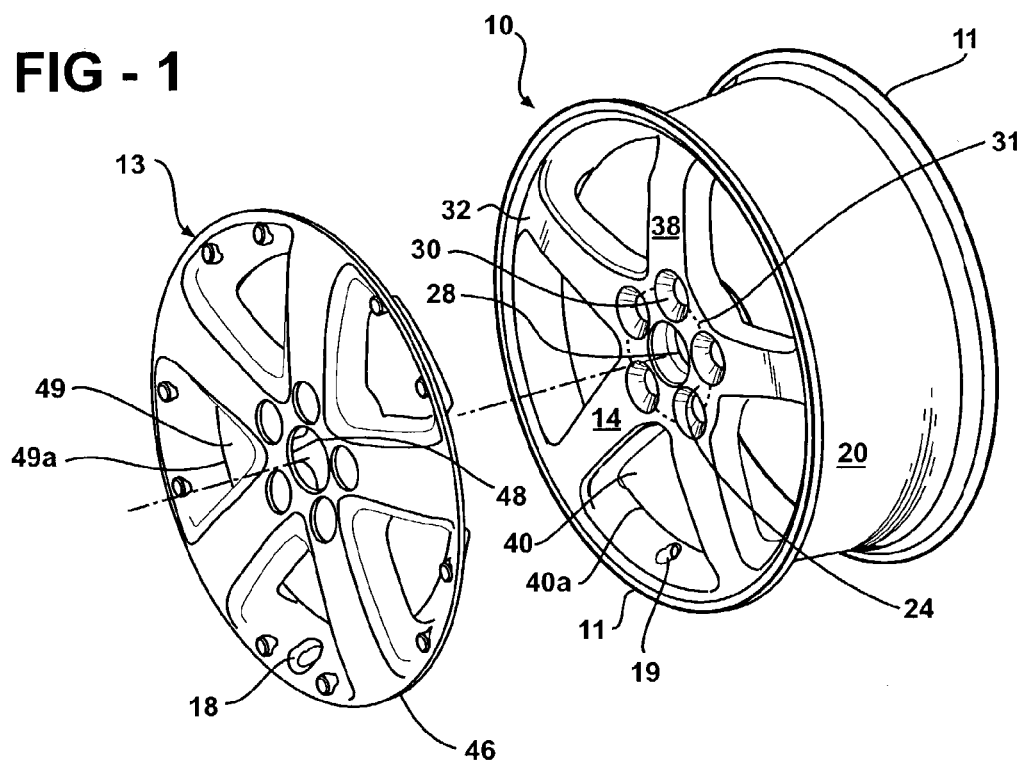
FIG. 1 is an exploded, perspective view of a wheel and overlay according to the preferred embodiment of the present invention.

Referring now to the drawings, there is illustrated in FIG. 1 an exploded, perspective view of an automobile wheel 10. The wheel 10 is preferably a one piece aluminum wheel having a rim portion 11 and a disc portion 14. Together the disc portion 14 and the rim portion 11 define an outboard surface 32 of the wheel 10. A wheel cover or overlay 13 is attached to the wheel 10 as will be described hereinafter.

Although this invention is discussed in conjunction with the particular wheel 10 disclosed herein, it will be appreciated that the invention may be used with other types of wheel constructions. For example, the wheel can be a "bead seat attached" wheel (such as shown in FIG. 4 of U.S. Pat. No. 5,188,429 to Heck et al.), a "full faced" wheel (such as shown in FIG. 2 of U.S. Pat. No. 5,595,423, to Heck et al.), a "bimetal" wheel construction including an aluminum disc and a steel rim (such as shown in U.S. Pat. No. 5,421,642 to Wei et al.), a "modular wheel" construction including a "partial" rim and a full face wheel disc (such as shown in U.S. Pat. No. 5,360,261 to Archibald et al.), a cast aluminum one piece wheel, or a forged aluminum one piece wheel, all of which patents and others are incorporated herein by reference.

Figure 2C:
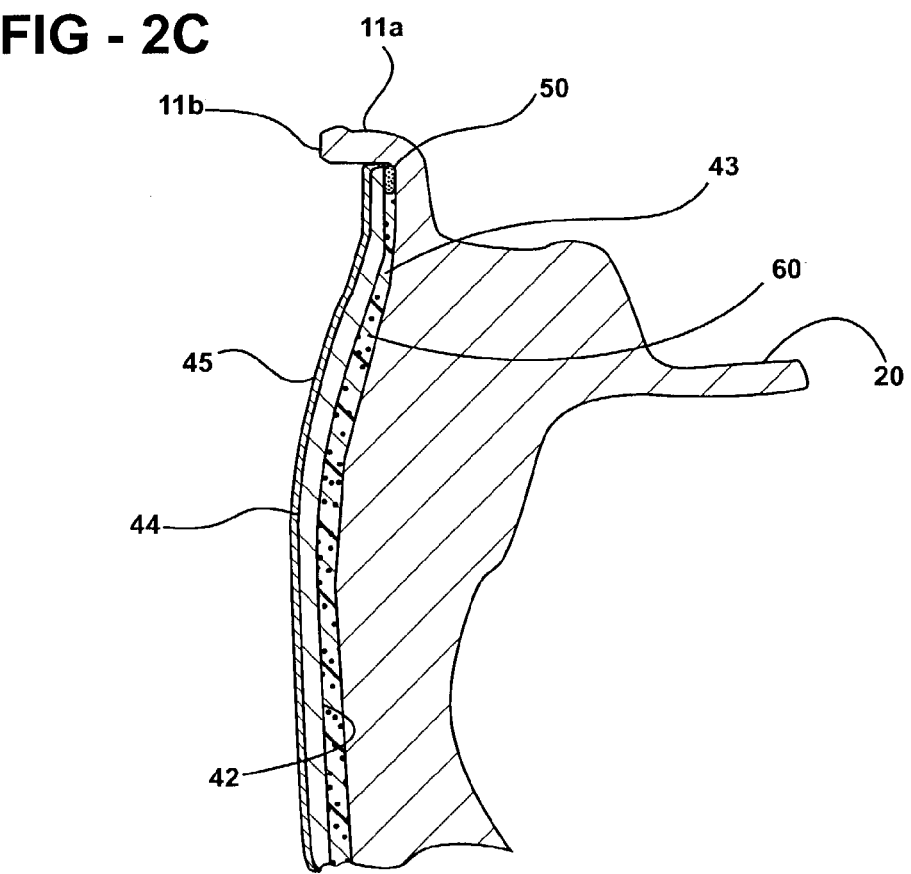
FIG. 2C is a partial cross-sectional view taken along lines 2C—2C of FIG. 2A.
Figure 2A:
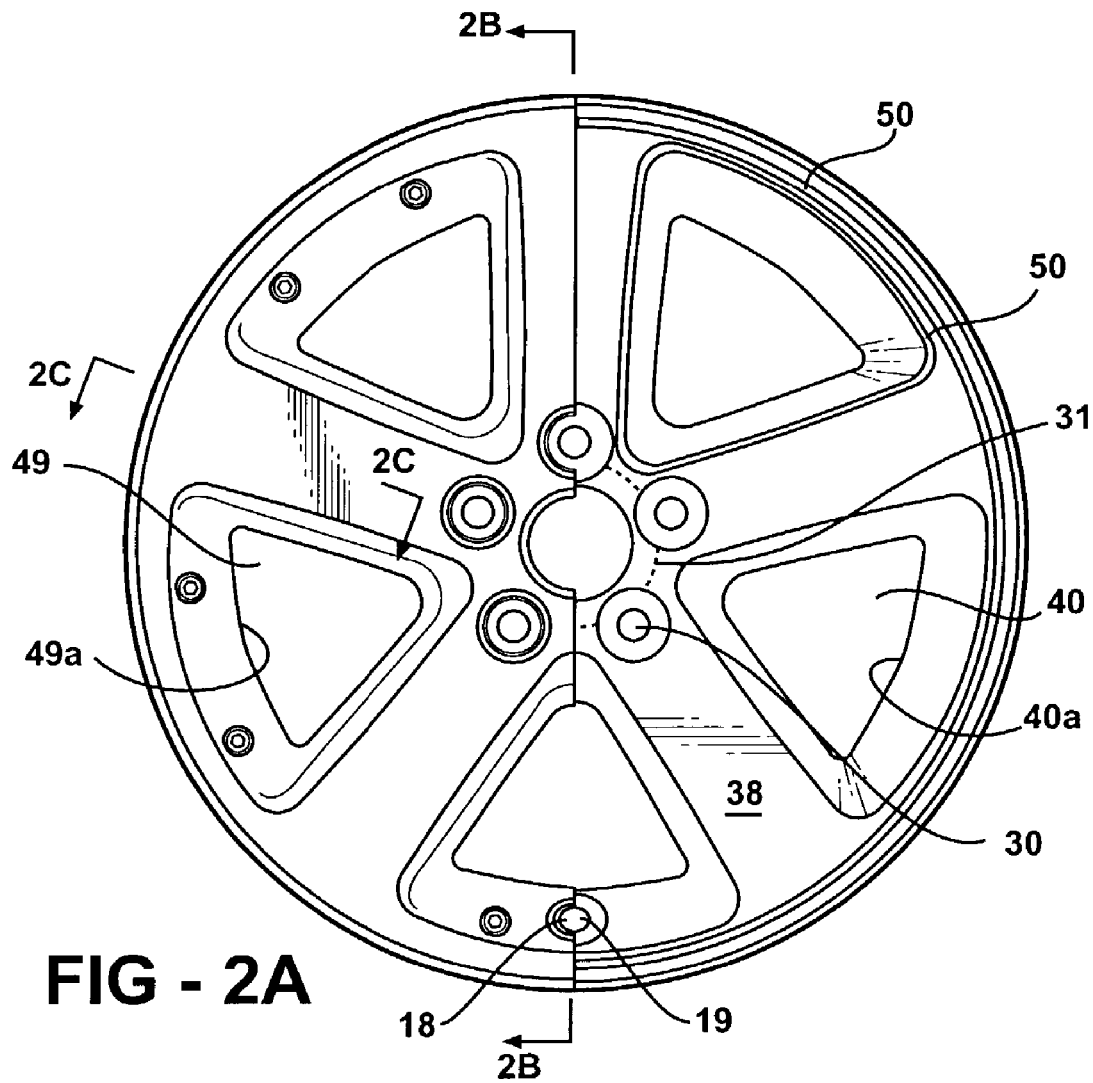
FIG. 2A is a partially cutaway side view of an overlay attached to a vehicle wheel in accordance with the preferred embodiment of the present invention.
Figure 2B:
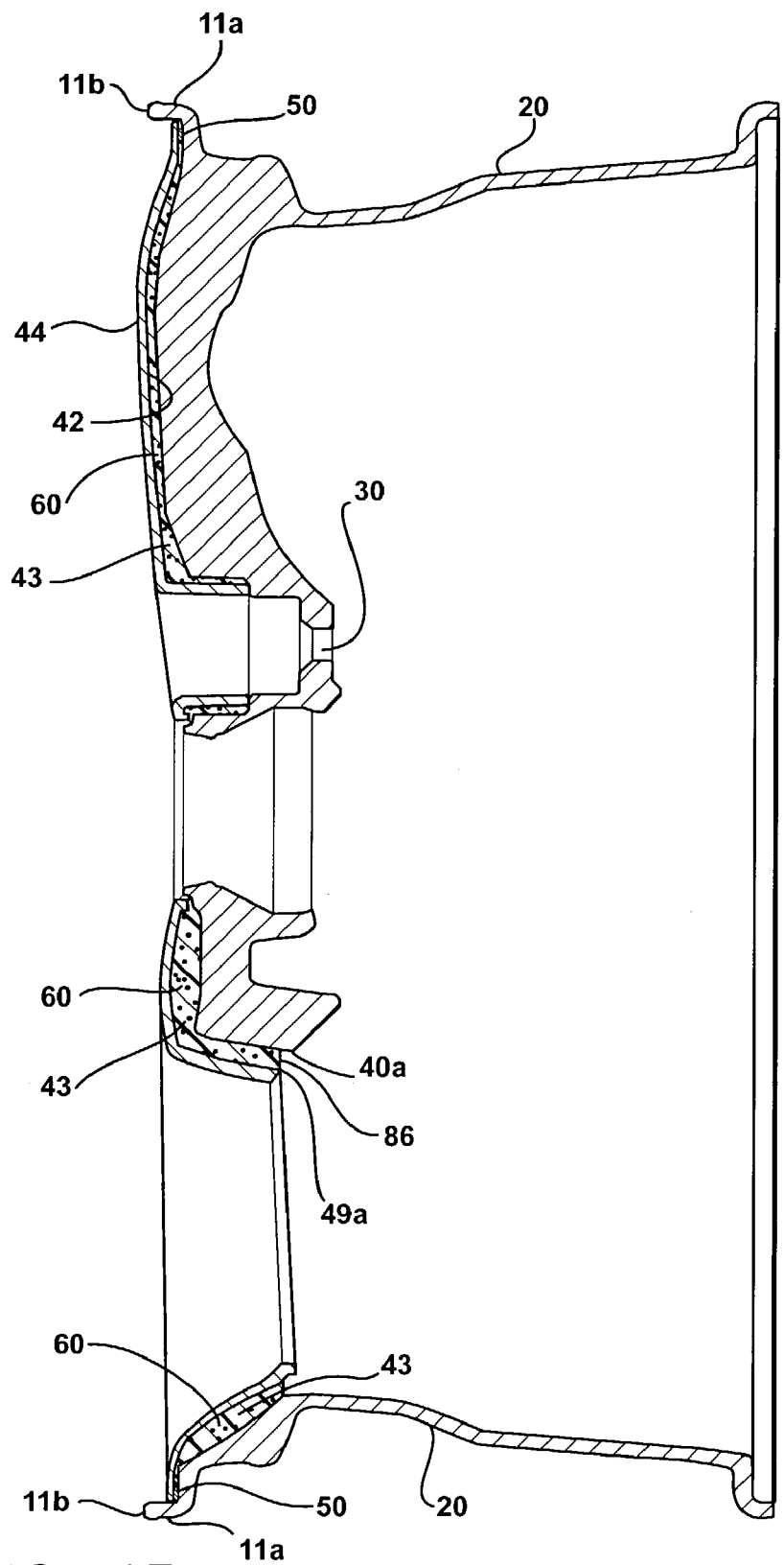
FIG. 2B is a cross-sectional view taken along lines 2B—2B of FIG. 2A.

Referring to FIGS. 1 and 2B–2C, the rim portion 11 of the wheel 10 includes a pair of rim flanges 11a each defining a rim lip 11b, a well 20 disposed between the pair of rim flanges 11a, and a valve stem opening 19. The disc portion 14 of the wheel 10 includes a plurality of spokes or spiders 38 with apertures 40 therebetween. Each aperture 40 defines an aperture periphery 40a. The apertures 40 circumscribe a generally centrally located wheel mounting surface 24, and are adapted to stylize the wheel 10 and/or cool the brakes (not shown). The wheel mounting surface 24 has a centrally located pilot aperture 28 therethrough and a plurality of lug bolt receiving holes 30 which together define a bolt hole circle 31.

Referring to FIGS. 1 and 2B, the wheel cover 13 is preferably a solid panel composed of a high impact, temperature resistant, chrome-plated plastic secured directly to the outboard surface 32 of the wheel 10. The wheel cover 13 includes an inboard surface 42; an outboard surface 44; an inner periphery 48; an outer periphery 46; a valve stem opening 18; and a plurality of turbine openings 49 each defining a turbine opening periphery 49a. The turbine openings 49 are disclosed as being aligned with the apertures 40 of the wheel 10, however such an arrangement should not be considered limiting as the present invention is adapted to accommodate numerous alternate configurations and arrangements of the components.

As shown in FIGS. 2B and 2C, the inboard surface 42 of the overlay 13 is configured to face the outboard surface 32 of the wheel 10 when mounted thereto. The outboard surface 44 of the overlay 13 is therefore visible when the overlay 13 is assembled to the wheel 10. The outboard surface 44 of the overlay 13 is adapted to receive a decorative treatment layer 45 that is preferably either electrochemically plated or painted thereon to provide an aesthetically pleasing impression of the wheel 10. The decorative treatment layer 45 could also be vacuum metallized, PVD, in mold coated or dry film. As a result, the outboard surface 44 of the overlay 13 can be configured to redefine the contour of the outboard surface 32 of the wheel 10.

According to the preferred embodiment, an adhesive sealant 50 (shown in FIG. 2C) is selectively disposed between the wheel cover 13 and the wheel 10, however it should be appreciated that the adhesive sealant 50 may not be necessary in some applications. Additionally, the adhesive sealant 50 of the preferred embodiment may be used in conjunction with an adhesion promoter or alternatively be replaced with a compound adapted exclusively for adhesion or exclusively for sealing, as required for a particular application. High strength adhesives and/or sealants suitable for use in the present invention include but are not limited to those classifiable as UV-cure adhesive sealants, and those classifiable as dual component adhesive sealants. UV-cure type adhesive sealants are identified as such because their cure time is significantly reduced by exposure to ultra-violet light. Dual component adhesive sealants are composed of two or more liquid components that chemically react when combined. The cure time of dual component adhesive sealants can generally be reduced by exposure to heat. Alternatively, a preformed gasket may be applied to the wheel 10 and/or the wheel cover 13 in place of the adhesive sealant 50.

Figure 3:
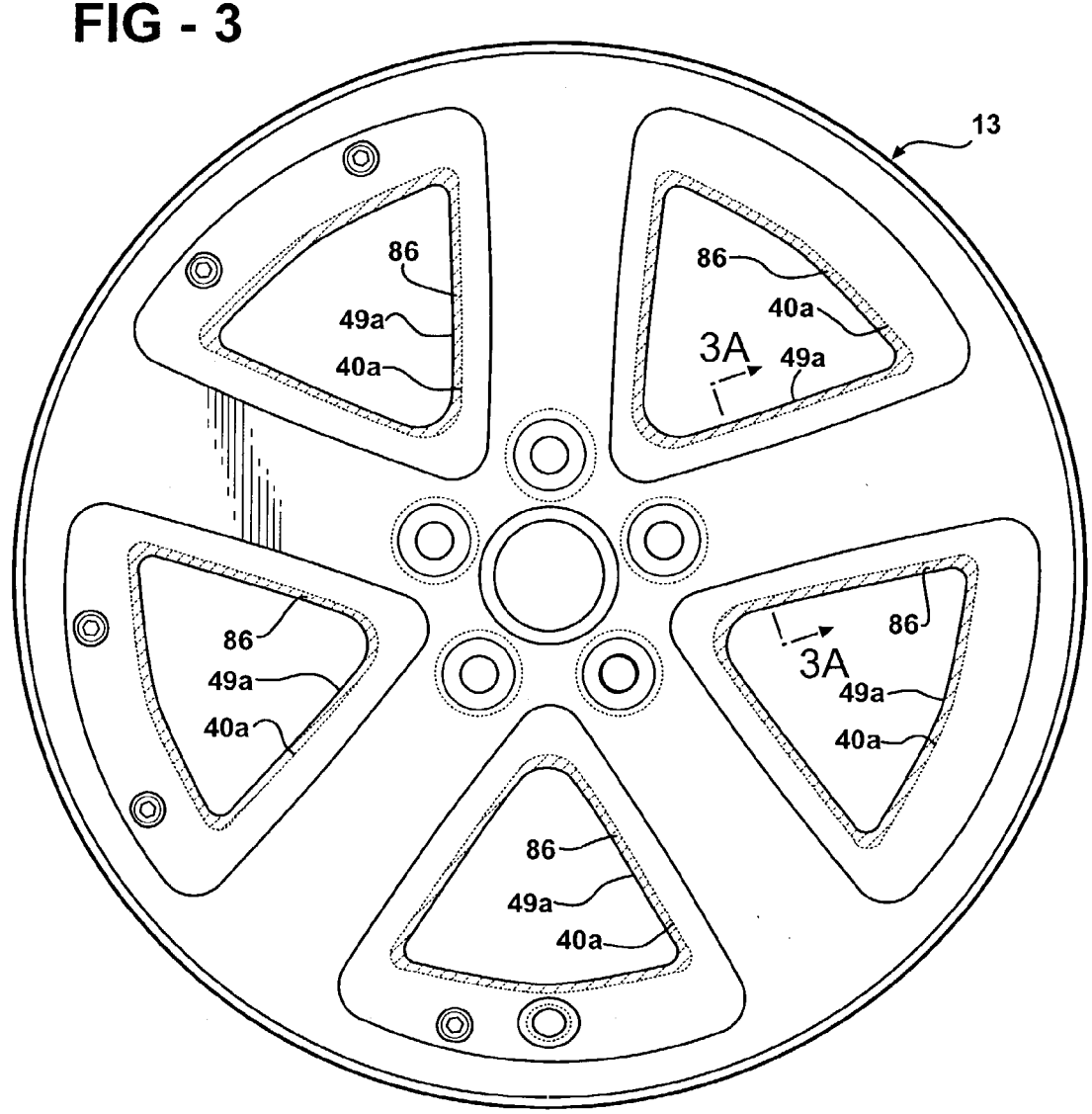
FIG. 3 is a plan view of an overlay attached to a vehicle wheel in accordance with the preferred embodiment of the present invention.

Snap tabs (not shown), incorporated herein by reference as shown in FIG. 3 of U.S. Pat. No. 5,597,213 to Chase and owned by the common assignee hereof, are preferably implemented to locate the overlay 13 on the wheel 10. The snap tabs also cause the overlay 13 to be spaced apart from the outboard surface 32 (shown in FIG. 1) of the wheel 10 defining a cavity 43 therebetween that accommodates adhesive foam 60 to permanently secure the overlay 13 to the wheel 10.

Assembly Method According to the Preferred Embodiment

Figure 4A:
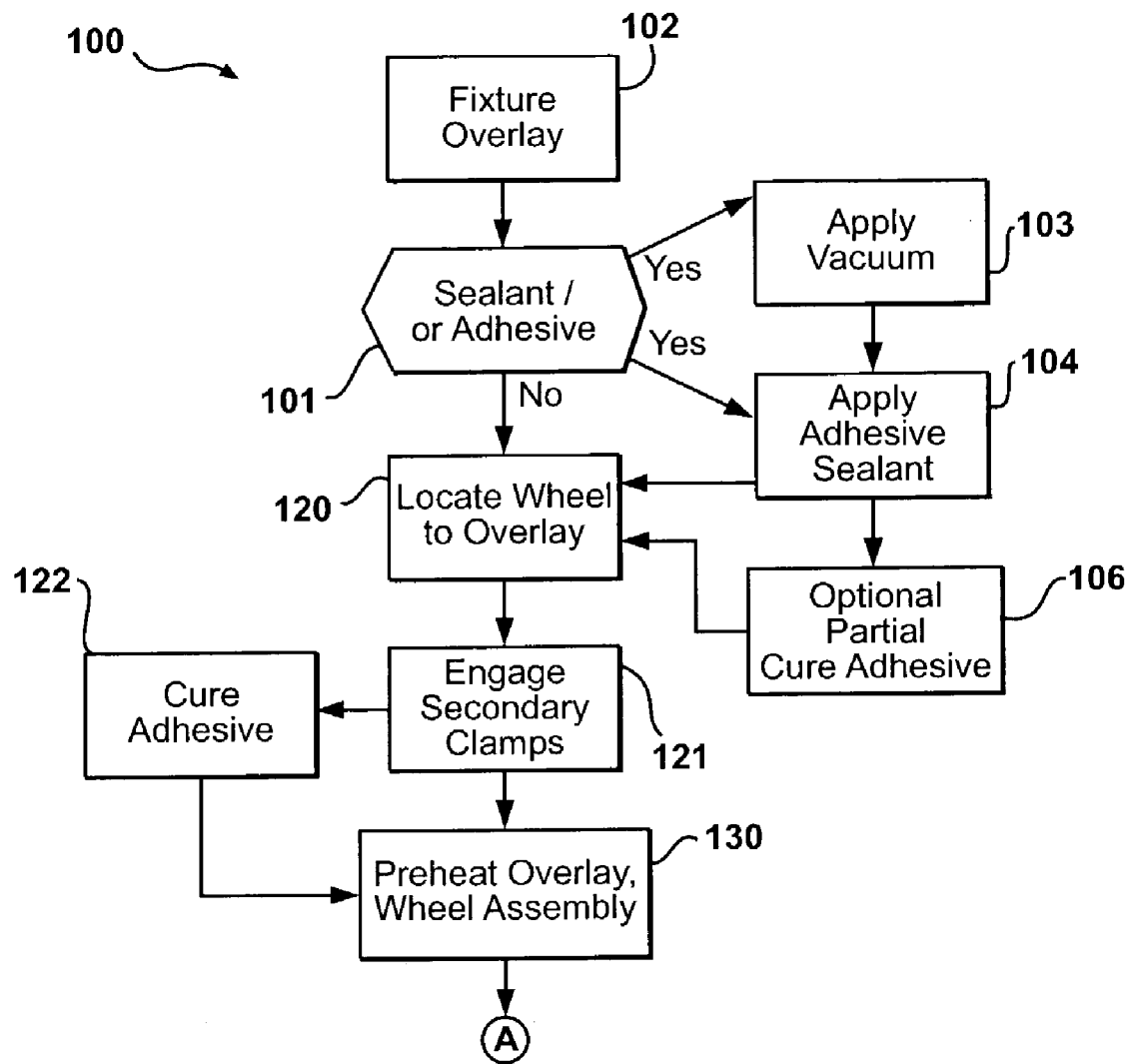
FIG. 4A is a flow chart depicting the beginning steps of the process of the present invention.
Figure 4B:
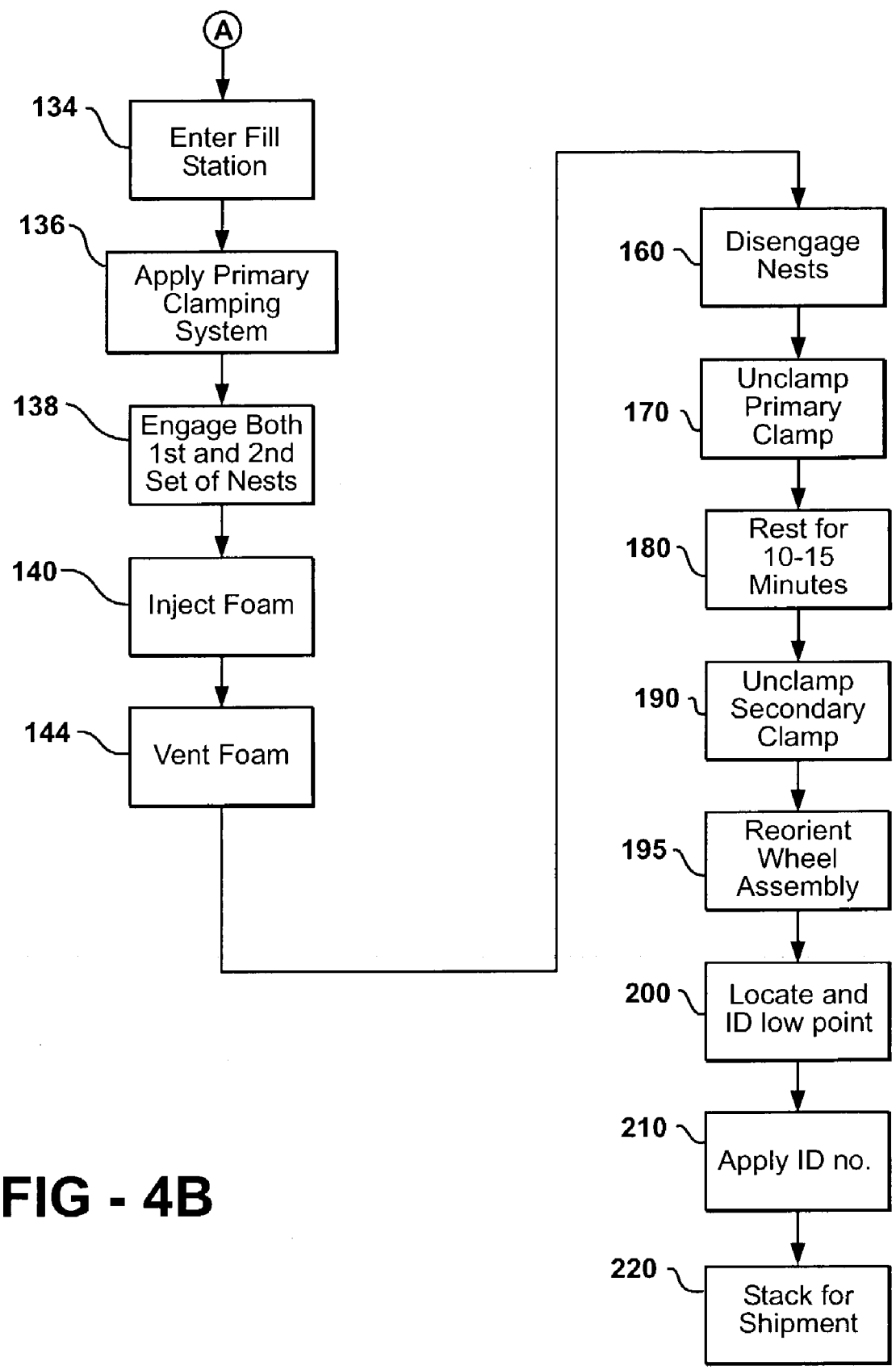
FIG. 4B is a continuation of the flow chart of FIG. 3A depicting the remaining steps of the process of the present invention.

The assembly method 100 of the present invention shown in the flow charts of FIGS. 4A–4B generally involves the steps of fixturing an overlay 102, applying an adhesive sealant 104 to the overlay, locating a wheel to the overlay 120, preheating the overlay/wheel assembly 130, and filling the cavity 43 (shown in FIG. 2B) with an adhesive foam 140. There are various optional steps and alternatives that will be discussed in detail throughout this assembly process. As indicated hereinabove, the preferred method is disclosed as including the step of applying an adhesive sealant 104 to the overlay before it is attached to the wheel, however it should be appreciated that this step may not be necessary in some applications.

Figure 5:
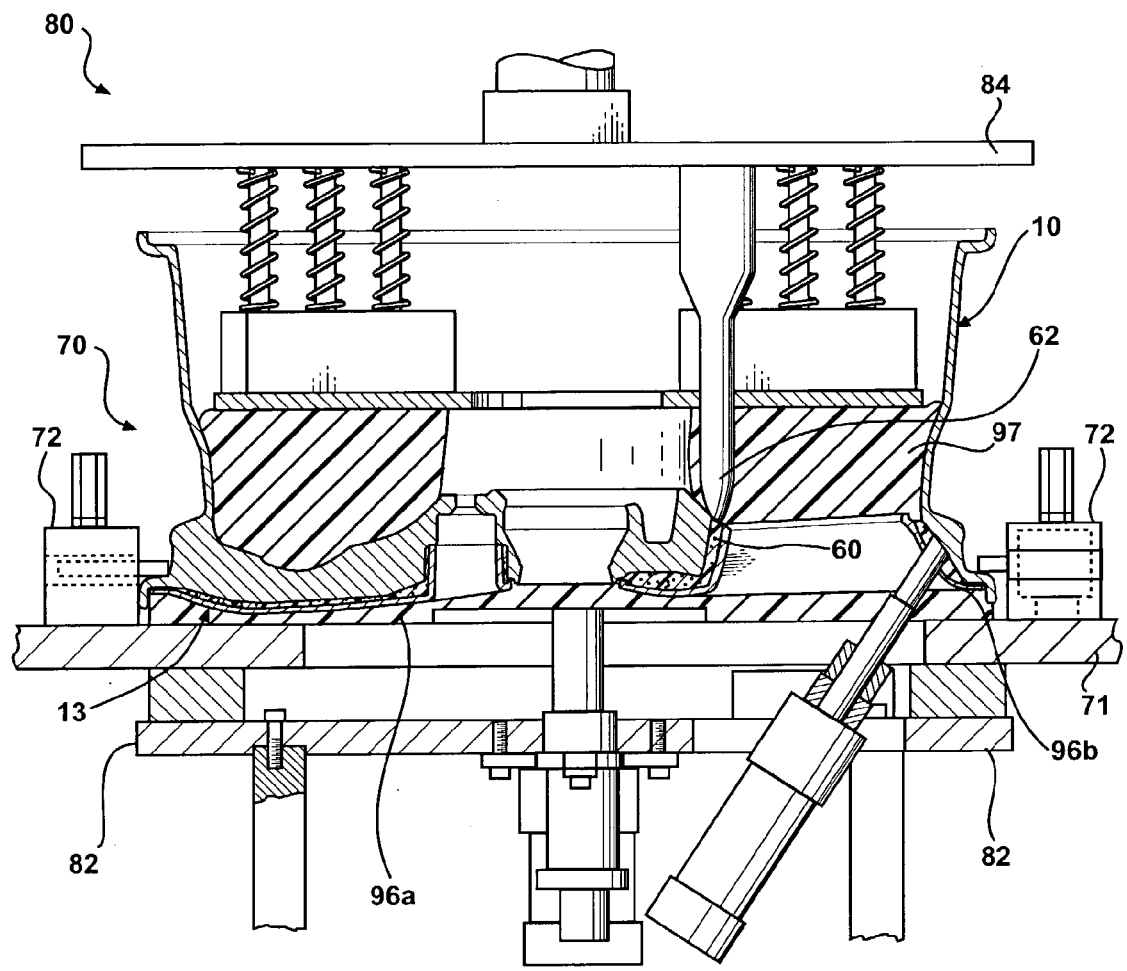
FIG. 5 is a partial cross-sectional view of the fixtured overlay and wheel assembly in a filling station of the present invention.

Referring to FIGS. 1, 2B and 5, the wheel cover 13 is located and oriented with the outboard surface 44 face down in a fixture 70 adapted to accommodate both the wheel 10 and the wheel cover 13. The overlay 13 is preferably radially and axially located at the outer periphery 46 and circumferentially located at the turbine opening periphery 49a of one of the turbine openings 49, however alternate features may be used to locate in other applications.

Referring again to FIG. 4A, after fixturing the overlay 102, a vacuum may optionally be applied 103 to the wheel cover to remove any warpage and assure a truer inboard surface. The step of applying the adhesive sealant 104 is preferably carried out by a programmable robot which provides a uniform bead along a precise path such that the adhesive sealant is less likely to move or droop before it sets. Optionally, the adhesive sealant 50 (shown in FIG. 2A) may be partially cured 106 before the wheel is joined to the wheel cover. According to the preferred embodiment, a dual component adhesive sealant is implemented and is partially cured by providing a rest period during which the components are allowed to react.

Referring to FIGS. 1 and 2C, the adhesive sealant 50 is applied to areas of the overlay 13 that produce noise, are difficult to seal, or are likely to entrap dirt, mud and/or water. Such areas typically include the outer periphery 46, the inner periphery 48, and/or around each turbine opening 49. Additionally, it is known that adhesive sealant 50 may be applied to the wheel 10 or overlay 13 and allowed to fully cure before the overlay 13 is applied to the wheel 10 in order to prevent noise and/or act as a foam dam. Finally, the adhesive sealant 50 may also be used to create foam flow patterns by directing the foam flow during the filling operation.

Referring again to FIG. 4A, the next step of the assembly method 100 is to locate the wheel to the overlay 120. If, however, the preferred step of applying adhesive sealant 104 is not implemented, locating the wheel to the overlay 120 becomes the second step of the assembly method 100. Referring to FIG. 1, the wheel is preferably located radially and axially at the rim flange 11a and circumferentially at the valve stem opening 19, however alternate features of the wheel 10 may be used to locate for other applications.

Referring now to FIGS. 1–5, the wheel 10 is loaded into the fixture 70 such that the outboard surface 32 of the wheel 10 engages the inboard surface 42 of the fixtured overlay 13 and forms the cavity 43 therebetween. In some applications an adhesion promoter can be used and is placed on either the outboard surface 32 or the inboard surface 42 or both before the cavity 43 is formed. Intermediate attachment and location features such as a secondary clamping system 72 (step 121 of FIG. 4A) can optionally be used to clamp the overlay 13 to the wheel 10 while the adhesive sealant 50 sets.

In high volume applications, the wheel/overlay assembly 10, 13 is placed on a palletized line. Individual pallets 71 on the palletized line move independently through a series of operations. In the embodiment that incorporates a palletized line, the individual pallets 71 are preferably equipped with the secondary-clamping system 72 to hold the wheel 10 in place on the overlay 13.

As shown FIGS. 4A–4B, an embodiment of the present invention wherein a UV-cure adhesive sealant is implemented generally includes the step of curing the adhesive sealant 122. After curing the adhesive sealant 122, the wheel/overlay assembly 10, 13 (shown in FIG. 1) is preheated 130. According to the preferred embodiment, however, a dual component adhesive sealant is implemented which cures during the step of preheating the wheel/overlay assembly 130 such that a separate curing step 122 is unnecessary. During the preheating step 130, the wheel/overlay assembly 10, 13 preferably reaches a temperature within the range of 90° to 190° Fahrenheit (32° to 88° C.) depending on the specific type of adhesive foam 60 (shown in FIG. 2B) utilized. Surface temperature affects the adhesive foam 60 in a variety of ways, including adhesion, gel, foam initiation time, cohesion, foam filling characteristics, and resultant mechanical properties.

After preheating 130, the wheel/overlay assembly 10, 13 is transferred to a check station (not shown) where infrared sensors check the temperature in several predetermined places. The wheel/overlay assembly 10, 13 is re-routed to the preheating station if it is below the appropriate temperature range. When the wheel/overlay assembly 10, 13 is within the appropriate temperature range, it is routed to a filling station 134.

As shown in FIG. 5, a filling station 80 generally includes a lower moving platen 82 and an upper platen 84 that together constitute the primary clamping system, a first set of nests 96a–96b, a secondary nest 97 and a foam metering unit (not shown). The foam metering unit includes an injector nozzle 62 disposed within the secondary nest 97, and is configured to inject the adhesive foam 60 into the cavity 43 (shown in FIG. 2B) as will be described in detail hereinafter. The fixture 70 is preferably tilted in a predetermined manner to assist adhesive foam flow and venting.

Referring to FIGS. 4B and 5, the filling station 80 processes the wheel/overlay assembly 10, 13 according to the following sequence. The primary clamping system is applied 136 to prevent separation of the wheel cover 13 from the wheel 10 during the injection and subsequent expansion of the adhesive foam 60 (shown in FIG. 2B). The first set of nests 96a–96b and the secondary nest 97 are simultaneously and independently engaged 138 thereby sealing the cavity 43 (shown in FIG. 2B) into which the adhesive foam is injected 140. The adhesive foam 60 is vented 144 during the injection process to release any air trapped within the cavity 43 such that the cavity 43 is uniformly filled to capacity with adhesive foam 60.

The step of applying the primary clamping system 136 is carried out by compressing the wheel/overlay assembly 10, 13 between the lower moving platen 82 and the upper platen 84. More precisely, the individual pallet 71 is located and then engaged by the lower moving platen 82 which lifts the individual pallet 71 until the wheel/overlay assembly 10, 13 engages and is adequately compressed by the upper platen 84.

The first set of nests 96a–96b includes a center bottom nest 96a configured to conform to the outboard surface 44 of the overlay 13 to provide support therefor while the foam is injected 140 and to prevent the overlay 13 from lifting off the wheel 10 when the adhesive foam 60 expands. The center bottom nest 96a is preferably manufactured using pour-in-place techniques with high durometer silicone, epoxy or urethane. Alternatively, the center bottom nest 96a can be cast or milled out of aluminum or steel. The first set of nests 96a–96b may also include a valve stem opening nest 96b adapted to independently seal the valve stem opening 19 of the wheel 10 and the valve stem opening 18 of the wheel cover 13. According to the preferred embodiment, adhesive sealant 50 is implemented in conjunction with the first set of nests 96a–96b and the secondary nest 97 to seal the cavity 43.

Figure 6:
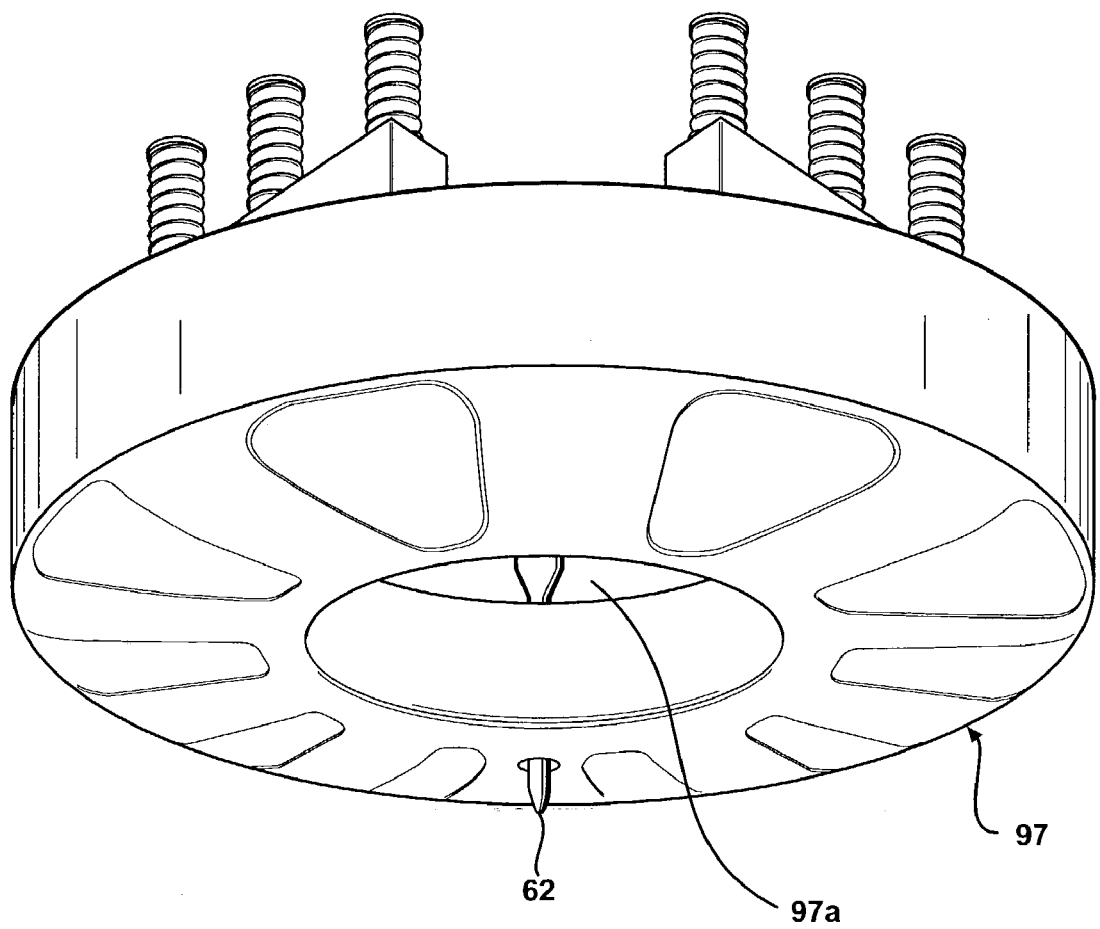
FIG. 6 is an isometric view of the secondary nest of the filling station shown in FIG. 5.

As shown in FIG. 6, the secondary nest 97 is generally cylindrical and includes a central clearance portion 97a therethrough. Referring to FIG. 5, the secondary nest 97 engages the inboard surface of the wheel/overlay assembly 10, 13 to seal the apertures 40 of the wheel 10 and the turbine openings 49 of the wheel cover 13. As most clearly shown in FIG. 2B, a gap 86 is formed between each aperture periphery 40a and its complimentary turbine opening periphery 49a. The location and relative alignment of the aperture periphery 40a and the turbine opening periphery 49a are somewhat imprecise due to manufacturing variation of the wheel 10 and the wheel cover 13. The secondary nest 97 is therefore composed of a soft resilient material such as silicone or urethane that is capable of being displaced in order to accommodate manufacturing variation of the components and ensure each gap 86 is properly sealed.

Figure 3A:
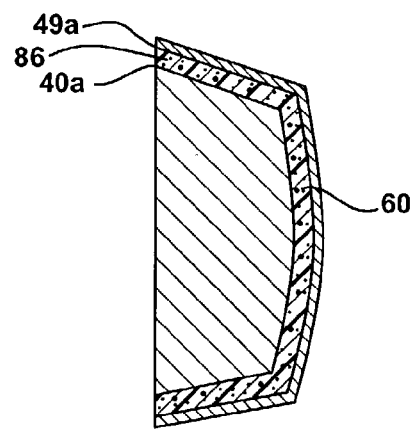
FIG. 3A is a partial cross-sectional view taken along lines 3A—3A of FIG. 3.

FIG. 3 shows a solid line representation of the turbine opening periphery 49a of the overlay 13, a dashed line representation of the aperture periphery 40a of the wheel 10, and a dashed cross-hatched portions representing the gaps 86. FIG. 3A provides a cross-sectional view of the relationship between the aperture periphery 40a of the wheel 10 and a complimentary turbine opening periphery 49a of the wheel 10, and also shows the gap 86 filled with adhesive foam 60. The injector nozzle 62 is preferably configured to radially align with a portion of one of the gaps 86 when the secondary nest 97 engages the wheel/overlay assembly 10, 13. The foam metering unit (not shown) then injects the adhesive foam 60 which is initially in a liquid phase through the gap 86 into the cavity 43 (shown in FIG. 2B). The present invention should not, however, be limited to the specific injection location of the preferred embodiment as it is envisioned that the injection may take place in a variety of locations as will be discussed hereinafter.

Referring again to FIG. 5, while the adhesive foam 60 is still in the liquid phase, it flows to the lowest portion of the cavity 43 (shown in FIG. 2B). As the level of adhesive foam 60 rises, air trapped within the cavity 43 must be released in order to make room for the expanding adhesive foam. The secondary nest 97 is therefore preferably vented so that any trapped air can be released through the vents thereby allowing the adhesive foam 60 to completely fill the cavity 43. Optionally, one or more vents can be connected to a controlled vacuum device (not shown) to further assist evacuation of the air from the cavity 43.

Figure 7:
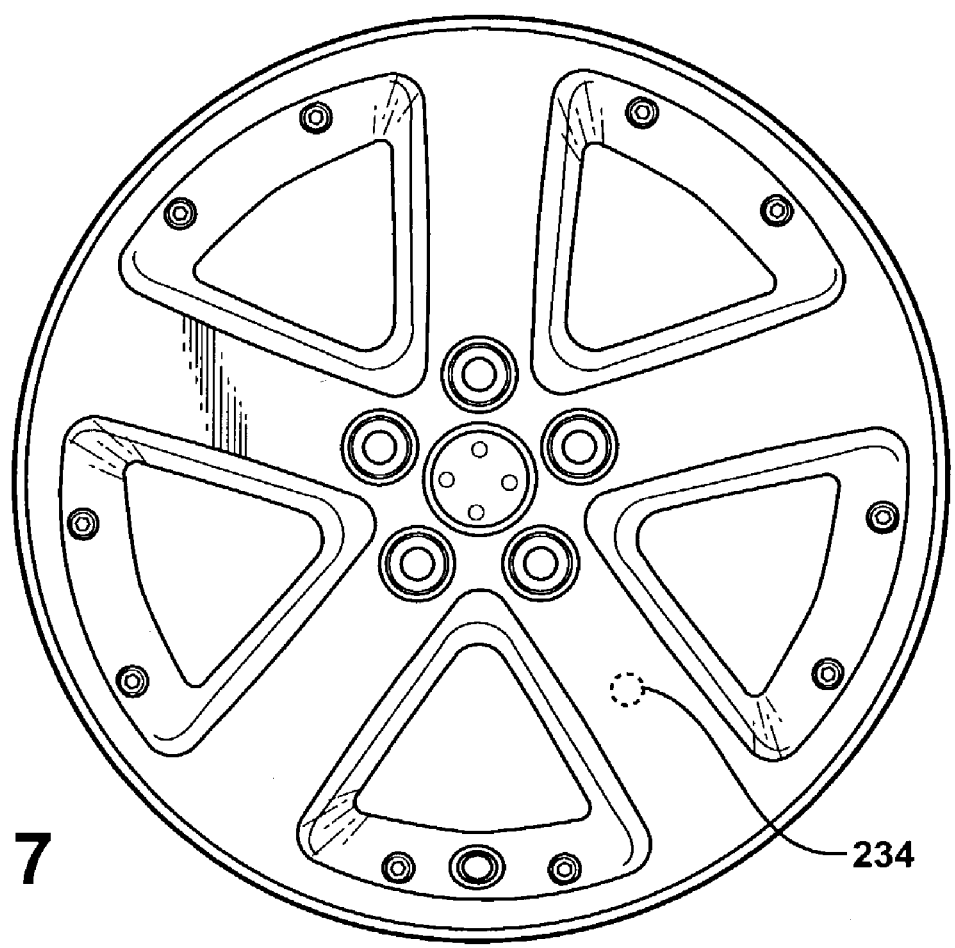
FIG. 7 is a wheel/overlay assembly according to an alternate embodiment of the present invention.
Figure 8:
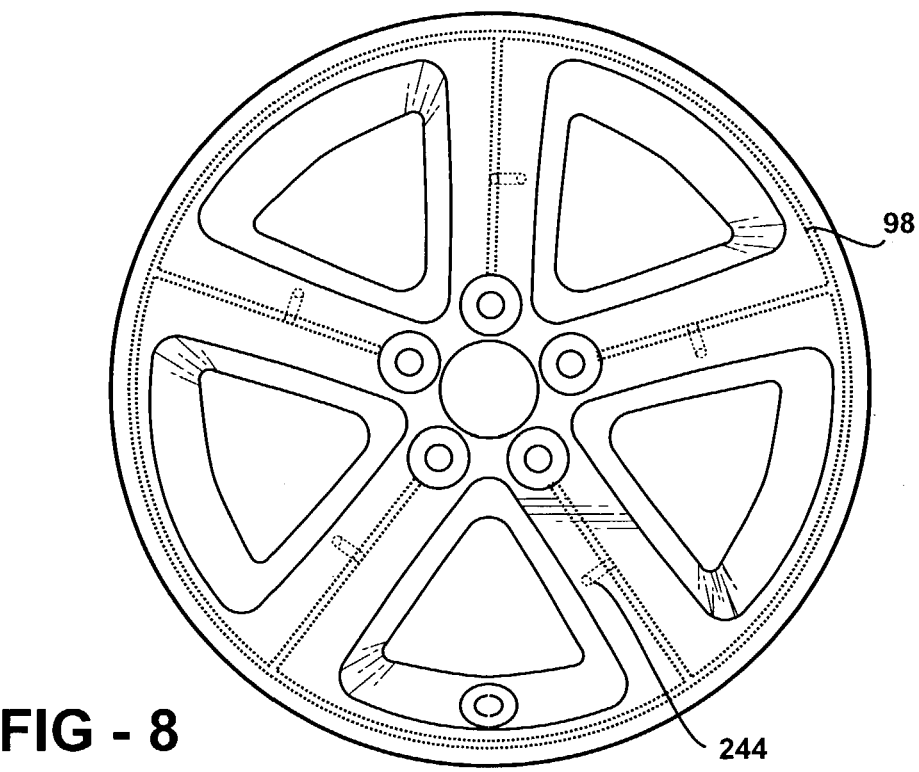
FIG. 8 is a wheel/overlay assembly according to an alternate embodiment of the present invention including a preferred flow channel configuration.
Figure 9:
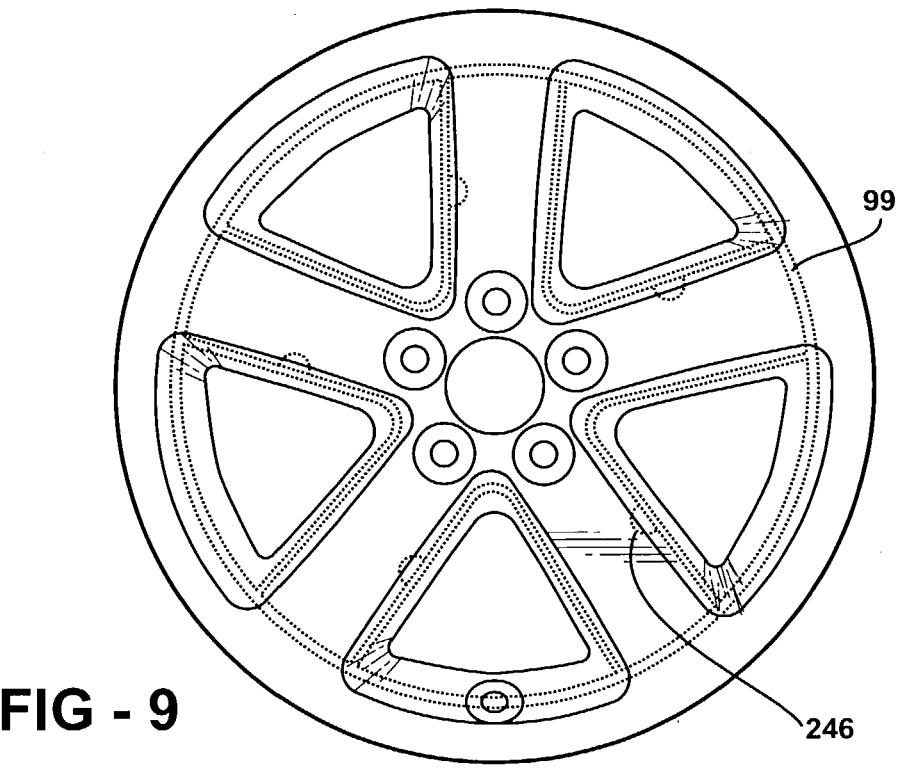
FIG. 9 is a wheel/overlay assembly according to the embodiment of FIG. 7 including an alternate flow channel configuration.

Referring to FIGS. 2B, and 7–9, some applications may require implementation of flow channels in order to ensure that the adhesive foam 60 reaches all the regions of the cavity 43 and that the cavity 43 is uniformly filled to capacity with adhesive foam 60. Flow channels 99 can be formed in a number of different ways such as by providing a concave surface or groove, or by applying a sealant bead in a pattern configured to direct the flow of the injected adhesive foam 60 while it is still in the liquid phase. FIG. 8 shows a first conventional flow channel configuration 98 depicted by the dash-lines wherein the adhesive foam 60 is directed to flow along the center of each spoke and around the rim flange. FIG. 9 shows another conventional flow channel configuration 99 depicted by the dash-lines wherein the adhesive foam 60 is directed to flow around the periphery of each wheel aperture and around the rim flange.

An alternate embodiment of the present invention provides a wheel and wheel cover identical to that of the preferred embodiment shown in FIGS. 1–2C, and further includes an injection hole 234 as shown in FIG. 7. Accordingly, the following disclosure should be considered in light of the reference numbers identified in FIGS. 1 through 6. The alternate embodiment disclosed in FIG. 7 is adapted to facilitate the injection of the adhesive foam 60 in applications implementing the flow channel configuration 98. The injection hole 234 is preferably disposed in the center of one or more of the spokes 38 such that adhesive foam 60 injected therethrough is introduced directly into the flow channel 98. Alternatively, in applications wherein it is not practical to inject directly into a flow channel, the injection hole 234 can be formed at an angle to direct the adhesive foam 60 from a more convenient injection location to the flow channel.

FIGS. 8–9 illustrate another alternate embodiment that provides a wheel and wheel cover that are highly similar to that of the preferred embodiment shown in FIGS. 1–2C. Accordingly, the following disclosure should be considered in light of the reference numbers identified in FIGS. 1 through 6. The geometry of the injector nozzle 62 limits the degree to which the adhesive foam 60 can be injected proximate an edge of the wheel 10. Therefore, the alternate embodiment disclosed herein includes a wheel 10 having a spoke 38 that provide clearance for the injector nozzle 62. Depending on the flow channel configuration for the specific application, the spoke 38 is provided with concave grooves 244 or 246. Additionally, it may be desirable to provide the concave grooves 244 or 246 in each of the spokes 38 as shown in FIGS. 8–9 in order to minimize wheel imbalance.

Referring to FIGS. 4A–4B and 5, after the foam is injected 140 the primary clamping system remains engaged for about two minutes while the pressure builds within the cavity 43 to about 20 psi. Thereafter the nests 96b, 97 are disengaged 160 and the primary clamping system is released 170. The newly foamed wheel/overlay assembly 10, 13 is permitted to rest for 10 to 15 minutes 180 under light clamping pressure of the secondary clamping system 72 as the foam 60 continues to expand. The secondary clamping system 72 is then unclamped 190 and the wheel/overlay assembly 10, 13 is indexed to a station where the individual pallet 71 is flipped over to reorient the wheel/overlay assembly 195 such that the outboard surface 32 of the wheel 10 faces upward. The wheel/overlay assembly 10, 13 is then placed back on the individual pallet 71 and directed to a station that locates and identifies the wheel/overlay assembly 10, 13 low point 200 for subsequent handling. A serial identification number is applied 210 to the wheel/overlay assembly 10, 13, and the wheel/overlay assembly 10, 13 is inspected and stacked for shipment 220.

While the present invention has been described in terms of a preferred embodiment, it is apparent that other forms could be adopted by one skilled in the art. In other words, the teachings of the present invention encompass any reasonable substitutions or equivalents of claim limitations. For example, the structure, materials, sizes, and shapes of the individual components could be modified, or substituted with other similar structure, materials, sizes, and shapes. Those skilled in the art will appreciate that other applications, including those outside of the automotive industry, are possible with this invention. Accordingly, the scope of the present invention is to be limited only by the following claims.

What is claimed is:

1. A method for attaching an overlay to a wheel, said method comprising the steps of:
   providing a wheel having an inboard surface, an outboard surface and a plurality of apertures therethrough, said plurality of apertures each defining an aperture periphery;
   providing an overlay having an inboard surface, an outboard surface and a plurality of turbine openings therethrough, said plurality of turbine openings each defining a turbine opening periphery;
   attaching said wheel to said overlay thereby providing a wheel/overlay assembly having an inboard surface and an outboard surface, said wheel/overlay assembly defining a cavity between said inboard surface of said overlay and said outboard surface of said wheel;
   heating said wheel/overlay assembly to a predetermined temperature;
   providing a foam filling station having a first nest and an oppositely disposed second nest, said second nest having a nozzle disposed therein such that said nozzle radially aligns with one of said plurality of wheel apertures when said second nest engages said wheel/overlay assembly, said second nest further having a vent;
   engaging said first nest with said outboard surface of said wheel/overlay assembly;
   engaging said second nest with said inboard surface of said wheel/overlay assembly such that said nozzle is radially aligned with one of said plurality of wheel apertures;
   injecting a predetermined quantity of adhesive foam through said nozzle, through said one of said plurality of wheel apertures with which said nozzle is radially aligned, and into said cavity;
   releasing air trapped within said cavity through said vent in said second nest while injecting said predetermined quantity of adhesive foam; and
   disengaging said first and second nests and removing said wheel/overlay assembly from said foam filling station.

2. The method according to claim 1 further comprising the step of applying an adhesive sealant to one of said inboard surface of said overlay and said outboard surface of said wheel before said step of attaching said wheel to said overlay.

3. The method according to claim 1 further comprising the step of applying an adhesive sealant to both said inboard surface of said overlay and said outboard surface of said wheel before said step of attaching said wheel to said overlay.

4. The method according to claim 1 further comprising the step of applying a preformed gasket to one of said inboard surface of said overlay and said outboard surface of said wheel before said step of attaching said wheel to said overlay.

5. The method according to claim 2, wherein said step of applying an adhesive sealant comprises the step of applying a UV-cure type adhesive sealant.

6. The method according to claim 2, wherein said step of applying an adhesive sealant comprises the step of applying a dual component adhesive sealant.

7. The method according to claim 2 further comprising the step of applying a vacuum to said overlay before said step of applying an adhesive sealant.

8. The method according to claim 1, wherein said step of attaching said wheel to said overlay further comprises the steps of:
   providing an assembly fixture adapted to locate and align said overlay and said wheel;
   loading said overlay into said assembly fixture with said outboard surface of said overlay facing downward; and
   loading said wheel into said assembly fixture such that said outboard surface of said wheel engages said inboard surface of said overlay.

9. The method according to claim 1, wherein said step of attaching said wheel to said overlay further comprises the step of radially aligning said plurality of apertures with said plurality of turbine openings such that a gap is defined between each said aperture periphery and said turbine opening periphery aligned therewith.

10. The method according to claim 9, wherein said step of providing a foam filling station further comprises the step of providing a second nest having a nozzle disposed therein such that said nozzle radially aligns with one of said gaps when said second nest engages said wheel/overlay assembly.

11. The method according to claim 10, wherein said step of injecting a predetermined quantity of adhesive further comprises the step of injecting said predetermined quantity of adhesive foam through said one of said gaps and into said cavity.

12. The method according to claim 1, wherein said step of heating said wheel/overlay assembly further comprises heating said wheel/overlay assembly to a predetermined temperature within the range of 90° to 190° Fahrenheit (32° to 88° C.).

13. A method for permanently attaching an overlay to a wheel, said method comprising the steps of:
providing a wheel having an inboard surface, an outboard surface and a plurality of apertures therethrough, said plurality of apertures each defining an aperture periphery;
providing an overlay having an inboard surface, an outboard surface and a plurality of turbine openings therethrough, said plurality of turbine openings each defining a turbine opening periphery;
attaching said wheel to said overlay such that said plurality of apertures radially align with said plurality of turbine openings, said alignment defining a gap between each said aperture periphery and the turbine opening periphery aligned therewith, said step of attaching said wheel to said overlay providing a wheel/overlay assembly having an inboard surface and an outboard surface, said wheel/overlay assembly defining a cavity between said inboard surface of said overlay and said outboard surface of said wheel;
heating said wheel/overlay assembly to a predetermined temperature within the range of 90° to 190° Fahrenheit (32° to 88° C.);
providing a foam filling station having a first nest and an oppositely disposed second nest, said second nest having a nozzle disposed therein such that said nozzle radially aligns with one of said gaps when said second nest engages said wheel/overlay assembly, said second nest further having a vent;
engaging said first nest with said outboard surface of said wheel/overlay assembly;
engaging said second nest with said inboard surface of said wheel/overlay assembly such that said nozzle is radially aligned with said one of said gaps;
injecting a predetermined quantity of adhesive foam through said nozzle, through said one of said gaps and into said cavity;
releasing air trapped within said cavity through said vent in said second nest while injecting said predetermined quantity of adhesive foam; and
disengaging said first and second nests and removing said wheel/overlay assembly from said foam filling station.

14. The method according to claim 13 further comprising the step of applying an adhesive sealant to one of said inboard surface of said overlay and said outboard surface of said wheel before said step of attaching said wheel to said overlay.

15. The method according to claim 13 further comprising the step of applying an adhesive sealant to both said inboard surface of said overlay and said outboard surface of said wheel before said step of attaching said wheel to said overlay.

16. The method according to claim 13 further comprising the step of applying a preformed gasket to one of said inboard surface of said overlay and said outboard surface of said wheel before said step of attaching said wheel to said overlay.

17. The method according to claim 14, wherein said step of applying an adhesive sealant comprises the step of applying a UV-cure type adhesive sealant.

18. The method according to claim 14, wherein said step of applying an adhesive sealant comprises the step of applying a dual component adhesive sealant.

19. The method according to claim 14 further comprising the step of applying a vacuum to said overlay before said step of applying an adhesive sealant.

20. The method according to claim 13, wherein said step of attaching said wheel to said overlay further comprises the steps of:
providing an assembly fixture adapted to locate and align said overlay and said wheel;
loading said overlay into said assembly fixture with said outboard surface of said overlay facing downward; and
loading said wheel into said assembly fixture such that said outboard surface of said wheel engages said inboard surface of said overlay.

21. A method for attaching an overlay to a wheel comprising the steps of:
providing a wheel having an inboard surface, an outboard surface and a plurality of spokes with apertures therebetween, said apertures each defining an aperture periphery, at least one of said plurality of spokes having a hole therethrough;
providing an overlay having an inboard surface, an outboard surface and a plurality of turbine openings therethrough, said plurality of turbine openings each defining a turbine opening periphery;
attaching said wheel to said overlay such that said apertures radially align with said plurality of turbine openings, said step of attaching said wheel to said overlay providing a wheel/overlay assembly having an inboard surface and an outboard surface, said wheel/overlay assembly defining a cavity between said inboard surface of said overlay and said outboard surface of said wheel, said cavity having a predefined flow channel therein, said flow channel being adapted to direct the flow pattern of a fluid to ensure said cavity is uniformly filled thereby;
heating said wheel/overlay assembly to a predetermined temperature within the range of 90° to 190° Fahrenheit (32° to 88° C.);
providing a foam filling station having a first nest and an oppositely disposed second nest, said second nest having a nozzle disposed therein, said nozzle being radially aligned with said hole in said spoke when said second nest engages said wheel/overlay assembly, said second nest further having a vent;
engaging said first nest with said outboard surface of said wheel/overlay assembly;
engaging said second nest with said inboard surface of said wheel/overlay assembly such that said nozzle engages said hole in said spoke;
injecting a predetermined quantity of adhesive foam through said nozzle, through said hole in said spoke, and along said predefined flow channel within said cavity;
releasing air trapped within said cavity through said vent in said second nest while injecting said predetermined quantity of adhesive foam; and
disengaging said first and second nests and removing said wheel/overlay assembly from said foam filling station.

22. The method according to claim 21, wherein said step of providing a wheel further comprises the step of providing said hole at a location adapted to introduce said adhesive foam directly into said flow channel.

23. The method according to claim 22, wherein said step of providing a wheel further comprises the step of forming said hole at a predetermined angle adapted to introduce said adhesive foam directly into said flow channel.

24. A method for attaching an overlay to a wheel comprising the steps of:

provding a wheel having an inboard surface, an outboard surface and a plurality of spokes with apertures therebetween, said apertures each defining an aperture periphery, at least one of said plurality of spokes having a concave groove therein;

providing an overlay having an inboard surface, an outboard surface and a plurality of turbine openings therethrough, said plurality of turbine openings each defining a turbine opening periphery;

attaching said wheel to said overlay such that said apertures radially align with said plurality of turbine openings, said alignment defining a gap between each said aperture periphery and the turbine opening periphery aligned therewith, said step of attaching said wheel to said overlay providing a wheel/overlay assembly having an inboard surface and an outboard surface, said wheel/overlay assembly defining a cavity between said inboard surface of said overlay and said outboard surface of said wheel, said cavity having a predefined flow channel therein, said flow channel being adapted to direct the flow pattern of a fluid to ensure said cavity is uniformly filled thereby;

heating said wheel/overlay assembly to a predetermined temperature within the range of 90° to 190° Fahrenheit (32° to 88° C.);

providing a foam filling station having a first nest and an oppositely disposed second nest, said second nest having a nozzle disposed therein, said nozzle being radially aligned with said concave groove in said spoke when said second nest engages said wheel/overlay assembly, said second nest further having a vent;

engaging said first nest with said outboard surface of said wheel/overlay assembly;

engaging said second nest with said inboard surface of said wheel/overlay assembly such that said nozzle engages said concave groove in said spoke;

injecting a predetermined quantity of adhesive foam through said nozzle, through said concave groove in said spoke, and along said predefined flow channel within said cavity;

releasing air trapped within said cavity through said vent in said second nest while injecting said predetermined quantity of adhesive foam; and disengaging said first and second nests and removing said wheel/overlay assembly from said foam filling station.

25. The method according to claim 24, wherein said step of providing a wheel further comprises the step of providing said concave groove at a location adapted to facilitate the introduction of said adhesive foam directly into said flow channel.

26. The method according to claim 25, wherein said step of providing a wheel further comprises the step providing said concave groove within each of said plurality of spokes such that wheel balance is maintained.

* * * * *

UNITED STATES PATENT AND TRADEMARK OFFICE
CERTIFICATE OF CORRECTION

| | | |
|---|---|---|
| PATENT NO. | : 7,097,730 B2 | |
| APPLICATION NO. | : 10/352311 | |
| DATED | : August 29, 2006 | |
| INVENTOR(S) | : James A. Woelfel and Brian C. Wrase | |

It is certified that error appears in the above-identified patent and that said Letters Patent is hereby corrected as shown below:

In Column 5, Line 58, Kindly delete "3A" and insert --4A--.

In Column 8, Line 1, Kindly delete "2A" and insert --2B and 2C--.

In Column 10, Line 8, Kindly delete "10" and insert --cover 13--.

In Column 13, Line 17, Claim 13, Kindly delete "the" and insert --each said--.

In Column 15, Line 15, Claim 24, Kindly delete "the" and insert --each said--.

Signed and Sealed this

Sixth Day of February, 2007

JON W. DUDAS
*Director of the United States Patent and Trademark Office*